Aug. 13, 1929.　　　　J. F. GRIM　　　　1,724,651

STANCHION

Original Filed Aug. 10, 1926

Inventor

J. F. Grim

By Lacey & Lacey, Attorneys

Patented Aug. 13, 1929.

1,724,651

UNITED STATES PATENT OFFICE.

JAMES F. GRIM, OF COMSTOCK, NEBRASKA.

STANCHION.

Original application filed August 10, 1926, Serial No. 128,439. Divided and this application filed June 8, 1927. Serial No. 197,396.

This application is a division of an application filed by me August 10, 1926, Serial No. 128,439.

The object of the present invention is to provide a novel construction whereby a stanchion may be easily opened or closed without requiring the attendant to enter the stall, and the stanchion will be firmly held in either the open or closed position. The invention is illustrated in the accompanying drawing and will be hereinafter fully set forth and defined.

In the drawing, Figure 1 is an elevation of the stanchion with parts of the stall frame in section.

Figure 1:
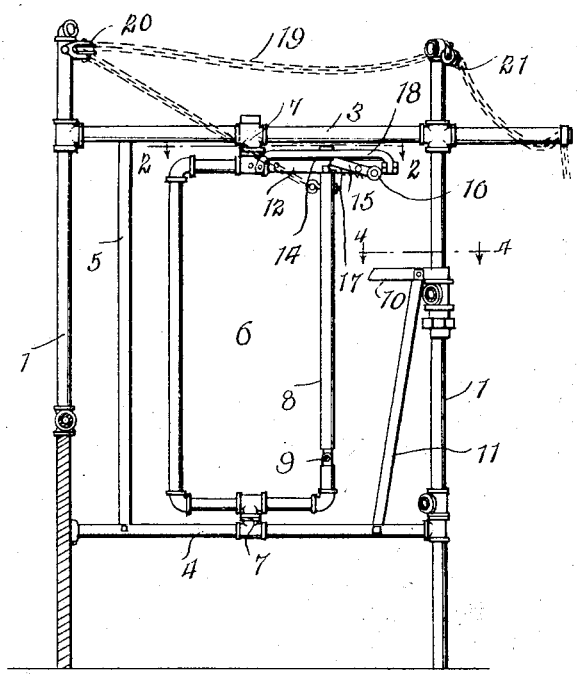
Figure 2:
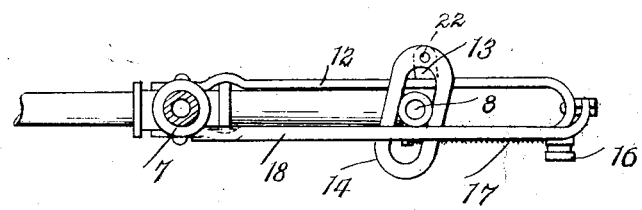
Figure 2 is an enlarged section on the line 2—2 of Figure 1.
Figure 3:
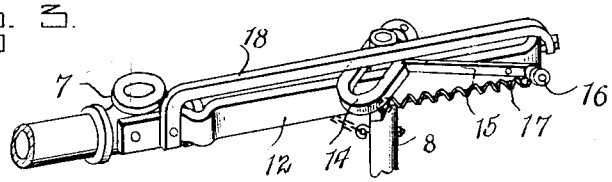
Figure 3 is a detail perspective view of the elements shown in Figure 2.
Figure 4:
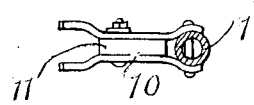
Figure 4 is a detail section on the line 4—4 of Figure 1.

The stanchion frame comprises posts 1 which are set up at a proper distance apart and may be anchored in any convenient manner. Near their upper ends, the posts are connected by a cross bar 3 which constitutes the upper frame bar of the stanchion and near their lower ends they are connected by a similar bar 4, a vertical brace 5 being secured to and extending between the said cross bars near that side of the stall which will, for convenience, be referred to as the off side. The stanchion, indicated as an entirety by the numeral 6, is supported by and between the cross bars 3 and 4 by swiveled couplings 7 permitting the stanchion to rock in a horizontal plane in a well known manner. The stanchion comprises a rocking side bar 8 which is pivoted at its lower end, as indicated at 9, and is movable to permit the animal's head to be inserted through the stanchion and then secured so as to prevent the withdrawal of the animal. Upon the post 1 at the near side of the stall is secured a holding element 10 reinforced by a bar 11, secured to and rising from the lower cross bar 4, and adapted to receive the rocking side bar 8 when the stanchion is opened. The upper end of the said bar 8 plays within a guide 12 secured to and extending laterally from the lower member of the upper swiveled coupling 7 so that the said bar 8 will be retained in the plane of the stanchion in both its opened and closed positions. Upon the front side of the guide 12 is a lug 13 and pivotally mounted upon the said lug is a slotted lever 14 which receives the upper end of the side bar 8 and controls the movement of the same. A latch 15 is pivoted upon the rear side of the guide 12 in position to engage the lever 14 and hold the same in its inner position, illustrated in Figures 2 and 3, so that the side bar 8 will be held normally in closed position. At the outer end of the latch 15 is a knob or other convenient form of handle 16 whereby it may be released, and a spring 17 is secured to the outer end of the latch and to the guide 12 so that the latch will be normally held in engagement with the lever and will automatically swing into engagement with it when the lever has been rocked to closed position. The lever extends across and rests upon the guide 12 and, to retain it upon the guide so that it will not ride up from the end of the stanchion bar 8, a loop or retaining bar 18 is secured to the swiveled coupling 7 and to the outer end of the guide 12 and extends longitudinally of the guide with its intermediate portion spaced above the latter, as clearly shown in Figure 3. A chain or cable 19 is attached to the upper end of the stanchion bar 8 and extends inwardly therefrom to a guide pulley 20 carried by the upper end of the off post 1 and then extends outwardly over a guide pulley 21 carried by the upper end of the near post 1 so that its end may be then reached by an operator at the side of the stall.

When the stanchion is opened, the bar 8 will rest in the holder 10 and will be thereby prevented from moving in the direction of the length of the stall so that the stanchion will be held entirely within the vertical plane of the front end of the stall. The animal is then driven into the stall and her head directed through the stanchion, whereupon a pull is exerted upon the chain or cable 19 which will be transmitted to the upper end of the bar 8 so that the bar may be rocked out of engagement with the holder 10 and brought against the end of the upper member of the stanchion. The lever 14 will, of course, be thereby rocked upon its vertical pivot 22 and will ride over the latch 15 which will automatically spring into engagement with a notch in the side of the lever when the lever clears the latch, thereby locking the side bar 8 in the closed position, as will be understood upon reference to Figures 2 and 3. To permit the stanchion to be opened, an upward pressure is exerted upon the knob or handle 16 so that the latch will swing downwardly out of engagement with the lever 14 and will permit the lever and the stanchion bar 8 to swing outwardly. As the lever 14 swings outwardly, it will pass over the latch 15 and will bear upon the same to hold it in the released position.

It will be noted that in closing the stanchion about the neck of the animal it will not be necessary for the operator to move into the stall nor to approach the animal, with possible irritation to her, but may positively close the stanchion while standing at the side of the stall.

The operator may easily reach through the open frame work to release the latch and grasp the rocking stanchion bar 8 to open the stanchion.

Having thus described the invention, I claim:

1. The combination with a stanchion including a relatively stationary part and a rocking side bar, of a guide for the said rocking side bar secured to and extending laterally from the relatively stationary member and in which the upper end of the rocking side bar plays, a lever pivotally mounted on the side of the said guide and extending over and resting upon the same and engaging the upper end of said rocking side bar, a latch pivotally mounted on the opposite side of the guide in position to engage the lever when the rocking side bar is in closed position, and yieldable means holding the latch in engagement with the lever.

2. A stanchion having a relatively stationary member and a rocking member, a guide for the rocking member carried by the relatively stationary member, a lever mounted on and supported by the guide and engaged with the upper end of the rocking member, a latch releasably engaged with the lever to hold the rocking member in closed position, and a retainer on the guide restraining the lever from movement away from the guide.

In testimony whereof I affix my signature.

JAMES F. GRIM. [L. S.]